US012731378B1

(12) United States Patent
Dhamija et al.

(10) Patent No.: US 12,731,378 B1
(45) Date of Patent: Sep. 8, 2026

(54) SELF-SERVICE FRAMEWORK FOR DETECTING VISUAL CONCEPTS

(71) Applicant: Samsara Inc., San Francisco, CA (US)

(72) Inventors: Akshay Raj Dhamija, Campbell, CA (US); Sven Eberhardt, Seattle, WA (US); Yan Wang, Mercer Island, WA (US); Phil Ammirato, Campbell, CA (US); Brian Westphal, Livermore, CA (US); William Nathan Hurst, Seattle, WA (US); William Evan Welbourne, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 212 days.

(21) Appl. No.: 18/543,452

(22) Filed: Dec. 18, 2023

(51) Int. Cl.
*G06V 10/764* (2022.01)
*G06T 7/11* (2017.01)
*H04L 67/306* (2022.01)

(52) U.S. Cl.
CPC .............. *G06V 10/764* (2022.01); *G06T 7/11* (2017.01); *H04L 67/306* (2013.01)

(58) Field of Classification Search
CPC ........ G06V 10/764; G06T 7/11; H04L 67/306
See application file for complete search history.

(56) References Cited

U.S. PATENT DOCUMENTS

2012/0233142 A1* 9/2012 Lawrence ........... G06F 16/9535 707/706
2023/0154213 A1* 5/2023 Gao ....................... G06V 10/25 382/159
2025/0028758 A1* 1/2025 Yoon .................... G06V 10/776

* cited by examiner

*Primary Examiner* — Jianxun Yang
(74) *Attorney, Agent, or Firm* — Schwegman Lundberg & Woessner, P.A.

(57) ABSTRACT

A system and method are described for enabling end users to create and refine object detection models using natural language and visual inputs. A user provides a prompt describing a target object. This prompt is processed to generate a feature vector representation. One or more images are also processed to detect object regions which are encoded into feature vectors. The prompt vector is compared against the image region vectors to identify relevant matching images. These images are displayed back to the user, along with bounding boxes indicating detected object regions. The prompt can be iteratively refined, allowing users to customize object detectors tailored to their use cases without needing machine learning expertise or model retraining.

18 Claims, 9 Drawing Sheets

300

RECEIVING A USER PROMPT THAT DESCRIBES A TARGET OBJECT
302

GENERATING A FEATURE EMBEDDING VECTOR BASED ON THE USER PROMPT THAT DESCRIBES THE TARGET OBJECT
304

PROCESSING ONE OR MORE IMAGES TO GENERATE A PLURALITY OF BOUNDING BOX REGIONS THAT CORRESPOND WITH ONE OR MORE OBJECTS DEPICTED WITHIN THE ONE OR MORE IMAGES
306

GENERATING A PLURALITY OF FEATURE EMBEDDING VECTORS BASED ON THE PLURALITY OF BOUNDING BOX REGIONS
308

PERFORMING A COMPARISON OF THE FEATURE EMBEDDING VECTOR WITH EACH OF THE PLURALITY OF FEATURE EMBEDDING VECTORS
310

IDENTIFYING AN IMAGE FROM AMONG THE ONE OR MORE IMAGES BASED ON THE COMPARISON
312

CAUSING DISPLAY OF A PRESENTATION OF THE IMAGE
314

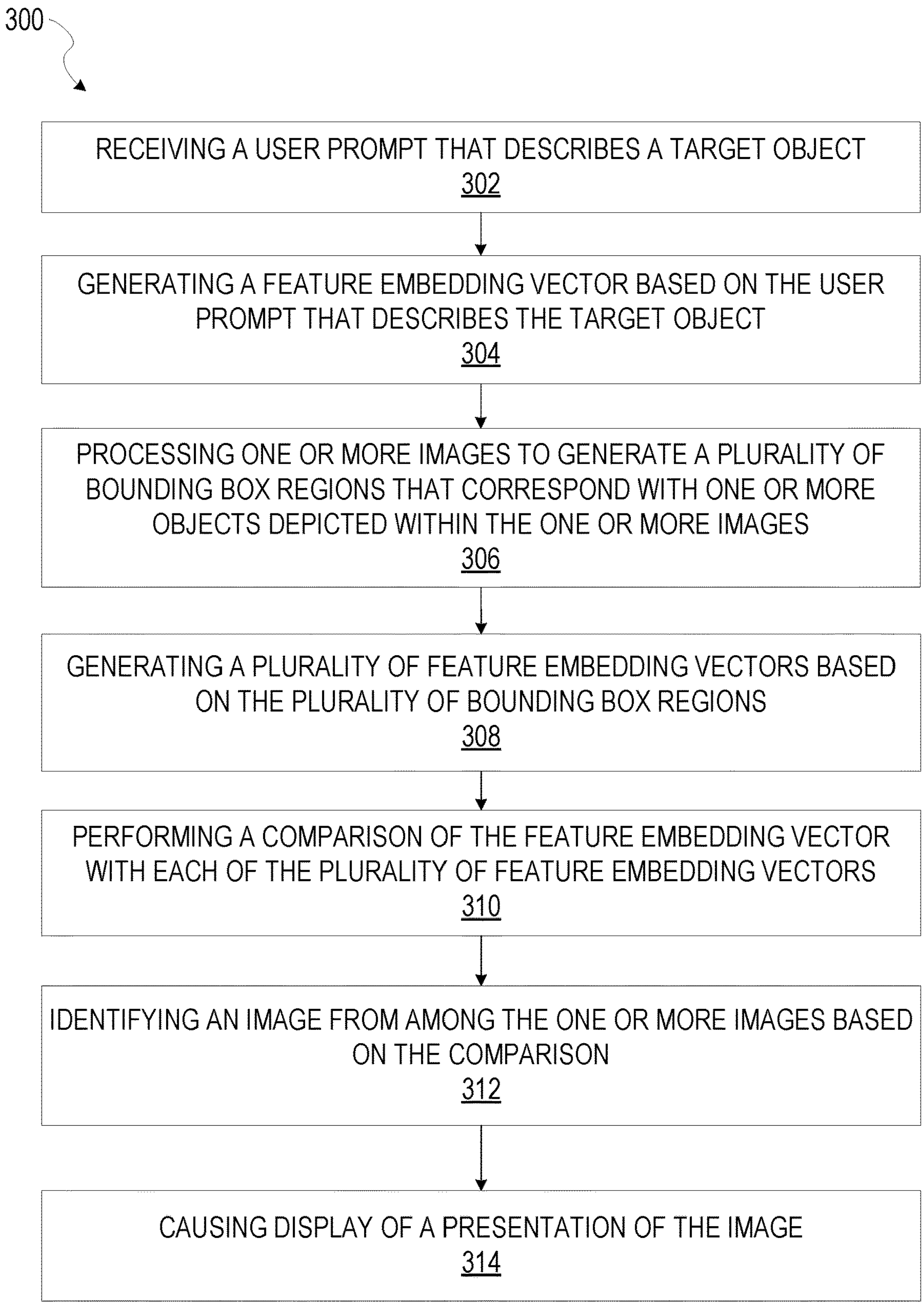

*FIG. 3*

RECEIVING A USER PROMPT THAT COMPRISES A TEXT STRING AND IMAGE DATA
402

GENERATING A FIRST EMBEDDING VECTOR BASED ON THE TEXT STRING
404

GENERATING A SECOND EMBEDDING VECTOR BASED ON THE IMAGE DATA
406

CONCATENATING THE FIRST EMBEDDING VECTOR AND THE SECOND EMBEDDING VECTOR TO GENERATE THE FEATURE EMBEDDING VECTOR OF THE USER PROMPT
408

IDENTIFYING A SET OF IMAGES FROM AMONG THE ONE OR MORE IMAGES BASED ON THE COMPARISON
502

DETERMINING SIMILARITY SCORES BASED ON THE SET OF IMAGES AND THE USER PROMPT
504

DETERMINING A RANKING OF THE SET OF IMAGES BASED ON THE SIMILARITY SCORES
506

CAUSING DISPLAY OF A PRESENTATION OF THE SET OF IMAGES BASED ON THE RANKING
508

SELF-SERVICE FRAMEWORK FOR DETECTING VISUAL CONCEPTS

TECHNICAL FIELD

The present disclosure relates generally to the field of computer vision and machine learning. More specifically, techniques are described for creating and refining object detection models using natural language and visual inputs provided by end users. The techniques enable users to tailor object detectors to their own use cases without requiring machine learning expertise or model retraining.

BACKGROUND

Object detection is a common task in computer vision and image analysis applications. The goal of object detection is to identify and localize all instances of objects from a given class within an image or video frame. Object detection has a wide range of uses, from automated surveillance and driver assistance in vehicles to analyzing medical images and robotics applications.

Traditionally, object detectors are created by training machine learning models on large, manually annotated datasets. Images are collected and each object instance is annotated with a bounding box and class label. The dataset often focuses on common objects like people, vehicles, animals, household items etc. Popular benchmark datasets used to train object detectors include COCO, OpenImages, PASCAL VOC among others.

The model are often trained to both classify objects within each candidate region and also localize by outputting bounding box coordinates. State-of-the-art techniques rely on deep neural networks like convolutional neural networks (CNNs) and region-based models like R-CNN. There are various network architectures tailored for object detection including SSD, YOLO, Faster R-CNN and others.

These data-driven techniques have enabled high accuracy on benchmark datasets. However, developing detectors for new objects or domains requires collecting and annotating significant amounts of training data. The process also requires machine learning and modeling expertise. As a result, creating customized object detectors tailored to specific user needs presents challenges. For example, it is often difficult to monitor busy sites for special events, as triggering alerts on all motion or anomalies may create too many alerts during regular operation, and aggregating safety events across multiple sites requires significant manual effort resulting in missed events.

Enabling end users to develop object detectors for objects and domains where training data is scarce is an open problem. New techniques are needed to allow users to create and refine detectors without requiring extensive new data collection and annotation. The present disclosure describes a technique to make object detector creation and customization accessible to end users without machine learning expertise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of identifying one or more images based on a user prompt, according to certain example embodiments.

DETAILED DESCRIPTION

Figure 1:
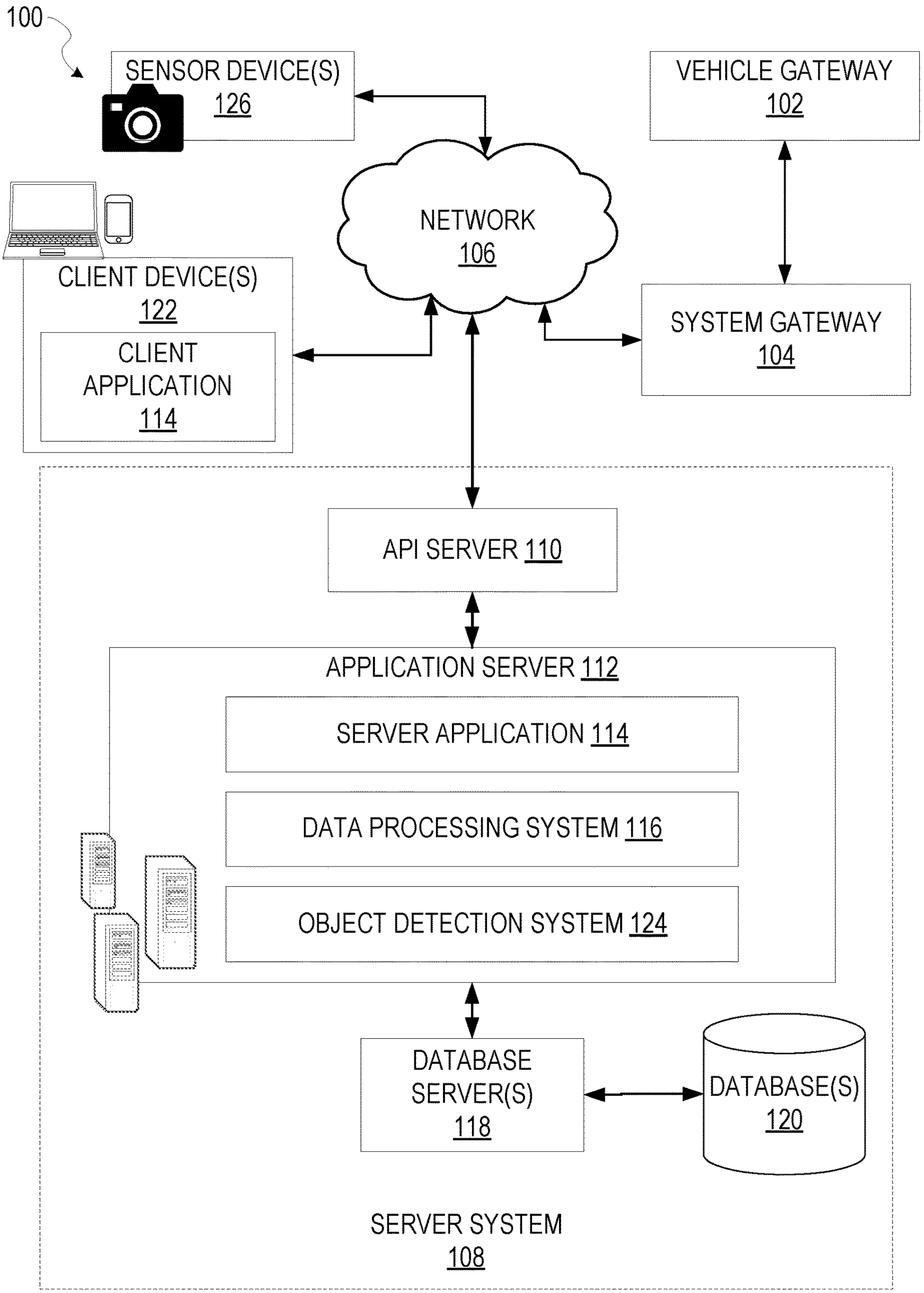
FIG. 1 is a block diagram showing an example system for exchanging data (e.g., sensor data and associated content) over a network in accordance with some embodiments, wherein the system includes an object detection system.

Object detection involves identifying and localizing instances of objects within images or videos using machine learning models. Traditionally, object detectors rely on models trained on large manually annotated datasets. This limits object detection to objects and classes for which training data is available. Enabling end users to create customized object detectors tailored to their own use cases presents challenges. New techniques are needed to allow end users without machine learning expertise to build object detectors for new objects and domains where training data is scarce.

The present disclosure describes an object detection system that allows end users to create and refine object detectors tailored to their use cases by providing natural language and visual inputs, in order to monitor a wide variety of facilities, vehicles, and sites for safety-relevant events, track real-world metrics and allow human-language querying of "what happened" at one or multiple locations.

For example, according to certain embodiments, the system aggregates all events from a plurality of raw data streams collected at one or more sites into a single event stream that can be processed, queried and aggregated using language models. The system may be implemented using a plurality of cameras at sites, with each site associated with metadata like location name. The system may process each camera/data stream as video-to-text (or image-to-text), also attaching site metadata like location and time. Redundant information may be removed from the single event stream, while using interest priors to maintain relevant data, wherein interest priors refer to a method that biases a model towards producing certain types of outputs based on an explicitly provided or learned set of interests.

In certain embodiments, the object detection system accepts a user prompt describing a target object. This prompt can be free-form text such as "An arriving truck" as well as an example image depicting the object or scenario (i.e., a distracted driver), or a combination thereof.

A prompt parser processes the text and/or image input to generate a feature embedding vector representing the prompt. For example, in some embodiments prompt embedding techniques such as Contrastive Language-Image Pre-training (CLIP) can be used. As discussed herein, an embedding vector is a numeric representation of an input in vector space. Prompt embedding techniques like CLIP can process an input image or text description into an embedding vector. The resulting embedding vectors have the useful property that vectors for matching images and texts are close together in the vector space.

Accordingly, the system may also process one or more input images to detect candidate object regions by applying an object detection model. This object detection model can rely on techniques like selective search, edge detection, segmentation models, region proposal networks, or other methods known in the art to identify object regions. The system extracts the identified regions and generates feature embedding vectors to represent each region.

A comparison module compares the prompt embedding vector to each of the region embedding vectors. Based on this comparison, relevant images from within a repository are identified where the region embedding matches the prompt within a threshold.

The prompt can be iteratively refined to improve the detector. Additional metadata can be used to filter images by various context factors during detection. The metadata may include location data, temporal data, device information, as well as user profile data. For example, in some embodiments a menu element may be presented within a graphical user interface (GUI), wherein the menu element may include one or more interface elements to receive inputs that select or otherwise identifier various contextual factors such as location, time of day, weather, speed, date, or other attributes associated with the images.

The identified images are displayed back to the user along with bounding boxes indicating the detected object regions within the GUI. For example, the identified images can be displayed in a grid-like layout within the GUI, and may be ordered based on their similarity score ranking, with the most relevant images shown first.

In some embodiments, metadata like date, time, location, speed, weather, filename, or other attributes can be displayed proximate to each thumbnail to provide context. A tooltip or pop-up with additional metadata can appear when the user hovers or clicks on an image.

Users can click on an image thumbnail to select it. This causes the display of a larger size of the image within the GUI. Bounding boxes are overlaid on the image indicating the regions detected as matching the search prompt. Buttons allow the user to zoom, pan, or rotate the image for closer inspection.

Additional metadata and context data about the selected image can be displayed within the GUI, such as in a side panel next to the enlarged image. This includes information like the similarity score, detection confidence values, metadata attributes, and other relevant data that aids the user in evaluating the detection results.

FIG. 1 is a block diagram showing an example system 100 for a self-service framework for detecting events and concepts, according to certain example embodiments. The system 100 includes one or more client devices 122 that host a number of applications including a client application 114. In some embodiments, the system 100 may include one or more sensor devices 126, which may include cameras. For example, the cameras may be placed at one or more sites, or within vehicles, to capture video footage for analysis. Metadata such as location name, current time, and other attributes may be attached to the video events generated by the cameras.

Each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the vehicle gateway 102 and the system gateway 104. While certain functions of the system 100 are described herein as being performed by either a client application 114, the vehicle gateway 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the vehicle gateway 102, or system gateway 104, where there may be sufficient processing capacity.

The server system 108 supports various services and operations that are provided to the client application 114. Such operations include transmitting data to, receiving data from, and processing data generated by the client application 114, the vehicle gateway 102, and the system gateway 104. In some embodiments, the vehicle gateway 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the Vehicle gateway 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an object detection system 124. According to certain example embodiments, the object detection system 124 is configured to enable users to create and refine custom object detectors tailored to their specific needs and data, without requiring machine learning expertise or model retraining, and to enable users to monitor multiple locations and track and be notified of events happening at those location.

In certain embodiments, the object detection system 124 accesses the sensor devices 126, which may include cameras deployed at a plurality of location, to generate a single data stream that comprises text descriptions of what is happening in the camera views. This text is combined into one stream of events. Then language models are used to process the text, filter out redundant information, and keep only the most relevant events.

A user of the client device 122 can ask questions in plain English about what happened, like "Did a delivery arrive today?" The system can search the text stream and respond with answers. It can also be trained to watch for specific events defined by the user and send alerts when those events occur.

In some embodiments, the object detection system 124 may cause display of a GUI at a client device 122, wherein the GUI allows users to provide natural language and visual prompts describing a target object or event of interest. In some embodiments, the object detection system 124 may receive a prompt from the client device 122, in order to process the prompt and generate a feature vector representation. The object detection system 124 may thereby access a database 120 containing a repository of images or video frames and processes these to detect candidate objects, representing each object region as a feature vector.

The object detection system 124 compares the prompt vector against the database image vectors to identify relevant matching images, which are returned to the client device 122 for display within a GUI. The matching images are displayed in the graphical user interface along with bounding boxes indicating detected object regions.

The server application 114 implements a number of data processing technologies and functions, particularly related to the aggregation and other processing of data (e.g., sensor data generated by the vehicle gateway 102). As will be described in further detail, the sensor data, including temporal data, asset status data, and GPS data points, generated by the vehicle gateway 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the vehicle gateway 102 and processed by the server application 114.

Figure 2:
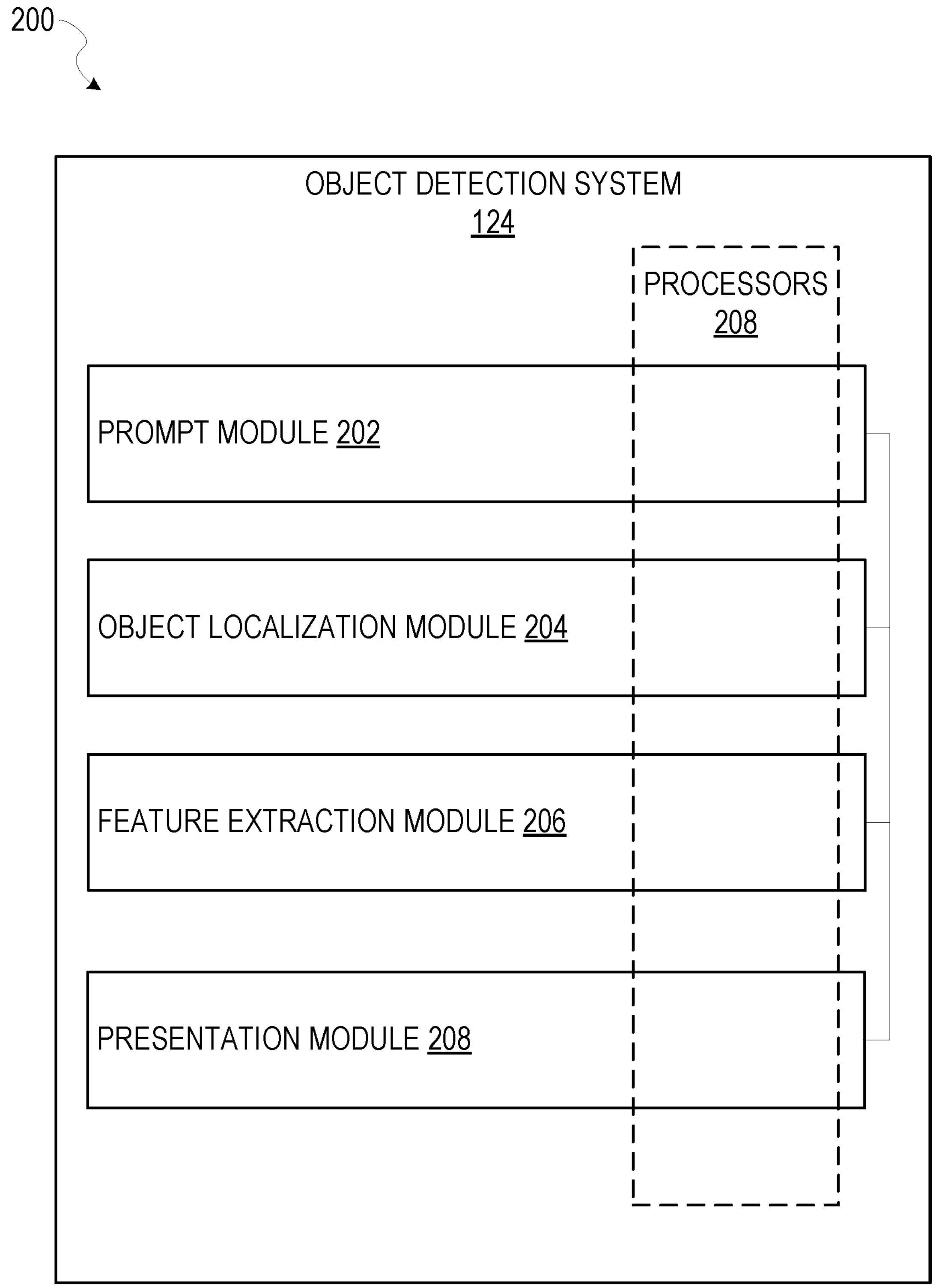
FIG. 2 is a block diagram illustrating various modules of an object detection system, according to certain example embodiments.

FIG. 2 is a block diagram 200 illustrating components of the object detection system 124 that configure the object detection system 124 to perform operations to create and refine custom object detectors, according to some example embodiments.

The object detection system 124 is shown as including a prompt module 202, an object localization module 204, a feature extraction module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the object detection system 124 may physically include an arrangement of one or more of the processors 210 (e.g., a subset of or among the one or more processors of the machine) configured to perform the operations described herein for that module. As another example, any module of the object detection system 124 may include software, hardware, or both, that configure an arrangement of one or more processors 210 (e.g., among the one or more processors of the machine) to perform the operations described herein for that module.

Accordingly, different modules of the object detection system 124 may include and configure different arrangements of such processors 210 or a single arrangement of such processors 210 at different points in time. Moreover, any two or more modules of the object detection system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some embodiments, the prompt module 202 is configured to receive and process the user's natural language or visual prompt describing their target object of interest. This includes parsing text prompts and generating embedding vectors to represent the user's input.

The object localization module 204 processes input images or videos to detect candidate object regions. The object localization module 204 may apply various object detection techniques to identify bounding boxes or segments corresponding to potential objects. Methods like selective search, edge detection, segmentation models, region proposal networks, or other techniques can be utilized.

The feature extraction module 206 generates feature representations for the detected object regions from the object localization module 204. This includes encoding the bounding box crop of each region into an embedding vector using a vision encoder model. The resulting region embeddings allow comparing against the prompt embedding.

The presentation module 208 handles the user interface and display of results back to the user at the client device 122. It surfaces the identified images and bounding boxes indicating regions matched to the user's prompt. Users can iteratively refine the prompt via the interface.

The comparison and matching of prompt to region embeddings can occur within any of the modules or be implemented separately. The modules use one or more processors 210 and may share computing resources and memory to enable the customized object detection workflow.

FIG. 3 is a flowchart depicting a method 300 of identifying one or more images based on a user prompt, according to certain example embodiments. Operations of the method 300 may be performed by the modules described above with respect to FIG. 2. As shown in FIG. 3, the method 300 includes one or more operations 302, 304, 306, 308, 310, 312, and 314.

At operation 302, the object detection system 124 receives a natural language or visual prompt from a client device 122 of a user, wherein the prompt describes a target object or concept of interest. The prompt can be received via a GUI of the client device 122. Example prompts include text, an uploaded image depicting the desired object, a selection of one or more contextual factors, or a combination thereof.

At operation 304, the received prompt is processed to generate a feature embedding vector representation of the prompt. Known techniques like CLIP can encode the text or image input into a vector representation. The resulting prompt embedding vector captures the semantic meaning of the user's input.

At operation 306, the object detection system 124 processes one or more images or videos within a database 120 to detect candidate objects. Object localization techniques like selective search, edge detection, segmentation models, region proposal networks, or other methods known in the art are applied to identify bounding boxes or segments corresponding to objects.

At operation 308, each detected object region from the previous operation is encoded into a feature embedding vector. A vision encoder model is applied to the bounding box crops to generate embedding vectors representing the visual features of each region.

At operation 310, the object detection system 124 performs a comparison of the prompt embedding vector to each region embedding vector. Mathematical comparison techniques like cosine similarity, inner products, or other known methods can compute the similarity of the prompt vector with each region vector.

Based on the comparison, at operation 312 the object detection system 124 identifies one or more images where the region embedding vector matches the prompt embedding within a defined threshold. The identified images contain object regions judged to match the user's search prompt.

At operation 314, the identified images are presented back to the user via a graphical user interface of the client device 122. The presentation includes displaying the images along with bounding boxes overlaid on matching object regions.

Figure 4:
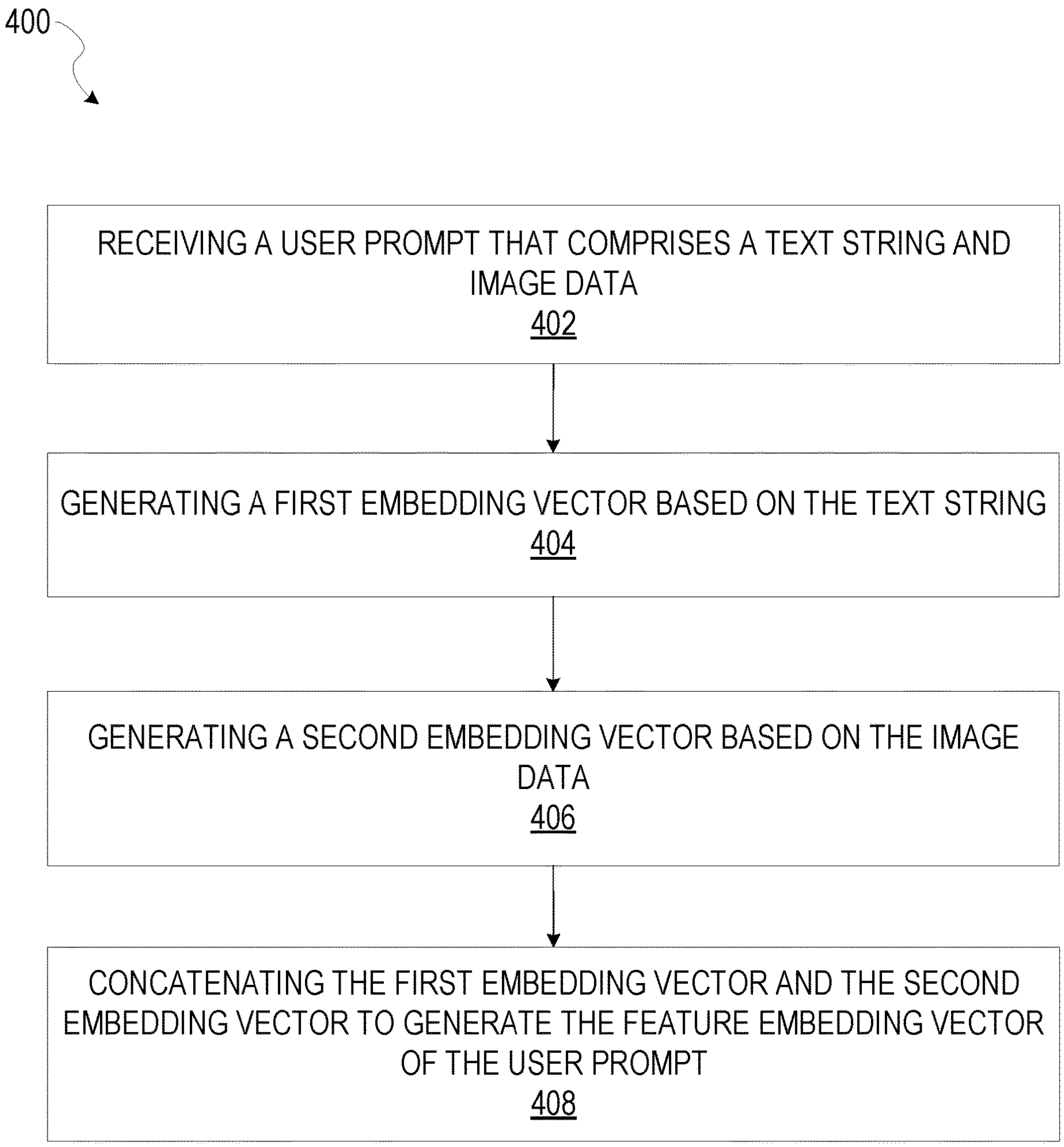
FIG. 4 is a flowchart depicting a method of generating a feature embedding vector based on a user prompt, according to certain example embodiments.

FIG. 4 is a flowchart depicting a method 400 of generating a feature embedding vector based on a user prompt, according to certain example embodiments. Operations of the method 400 may be performed by the modules described above with respect to FIG. 2. In some embodiments, the method 400 may be performed as a precursor or subroutine of operation 302 of the method 300 depicted in FIG. 3. As shown in FIG. 4, the method 400 includes one or more operations 402, 404, 406, and 408.

At operation 402, a user prompt comprising a text string and image data is received by the object detection system 124. The user prompt can be input through a graphical user interface displayed on a client device 122. Example text strings include phrases such as "drinking" or "using cell phone". Example image data includes uploaded images depicting the target object of interest, cropped portions of images, or other visual representations.

At operation 404, the text string portion of the prompt is processed to generate a first embedding vector representing the text semantics. Known natural language embedding techniques like CLIP can encode the text string into a dense vector representation capturing its semantic meaning. Other text embedding models and techniques known in the art can also be utilized.

At operation 406, the image data portion of the prompt is processed to generate a second embedding vector representing the visual features. Vision encoding models including CLIP or other models known in the art can embed the image pixels into a vector space compatible with the text embedding space. This allows comparing text and visual embeddings.

At operation 408, the text embedding vector and image embedding vector are concatenated or otherwise combined to create a unified feature embedding vector representing the full multi-modal user prompt. Simple concatenation can join the individual vectors into a single combined vector. Other techniques known in the art such as averaging or weighted combinations could also be applied.

The resulting prompt feature embedding vector encapsulates the visual and semantic information from the user's query. This allows robust comparison to embedding vectors of candidate image regions to identify relevant matches as detailed in FIG. 3.

Figure 5:
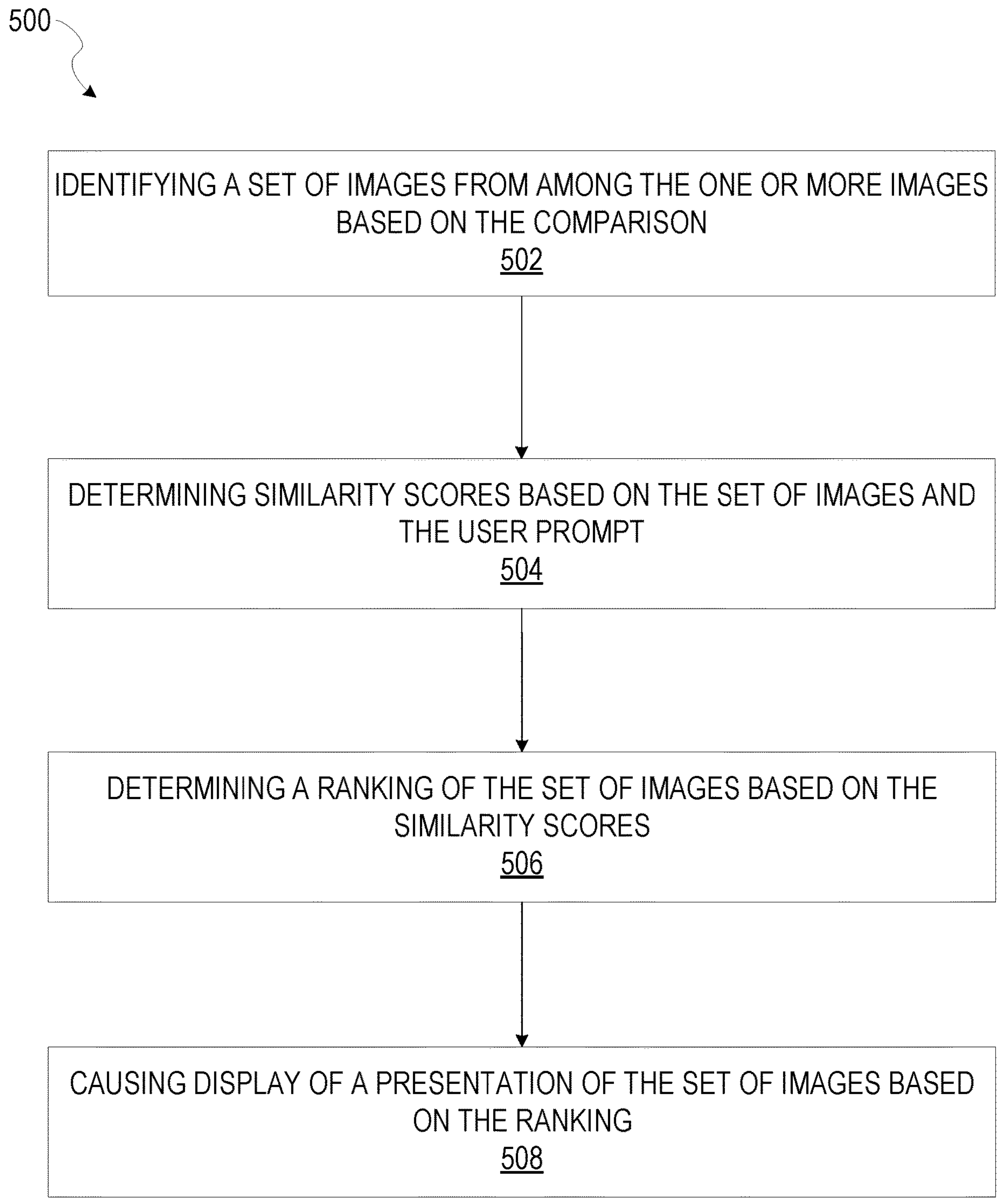
FIG. 5 is a flowchart depicting a method of causing display of a presentation of one or more images based on a user prompt, according to certain example embodiments.

FIG. 5 is a flowchart depicting a method 500 of causing display of a presentation of one or more images based on a user prompt, according to certain example embodiments. Operations of the method 500 may be performed by the modules described above with respect to FIG. 2. In some embodiments, the method 500 may be performed as a precursor or subroutine of operation 310 of the method 300 depicted in FIG. 3. As shown in FIG. 5, the method 500 includes one or more operations 502, 504, 506, and 508.

At operation 502, a set of images matching the user's prompt are identified based on comparing embedding vectors as described in operation 310 of the method 300 depicted in FIG. 3. This identifies images containing regions with embedding vectors close to the prompt vector. Different matching criteria can be used to select images, such as thresholding similarity scores.

At operation 504, the object detection system 124 determines a similarity score between the prompt and each identified image. The score can be computed by aggregating the similarity of the prompt vector with each region vector of the image. Techniques like taking the maximum or average similarity across regions can be used.

At operation 506, the images are ranked based on their similarity scores. A sorted list orders the images from highest to lowest score. Ranking provides a heuristic for relevance to the user's query.

At operation 508, the object detection system 124 causes display of the identified images in ranked order via a GUI of the client device 122. Display options include showing image thumbnails, metadata, overlaying region bounding boxes, etc. The ranked results allow users to quickly identify relevant images and refine their search prompt to improve the custom detector. Additional known ranking heuristics like timestamp, image resolution, etc. could also be incorporated.

Figure 6:
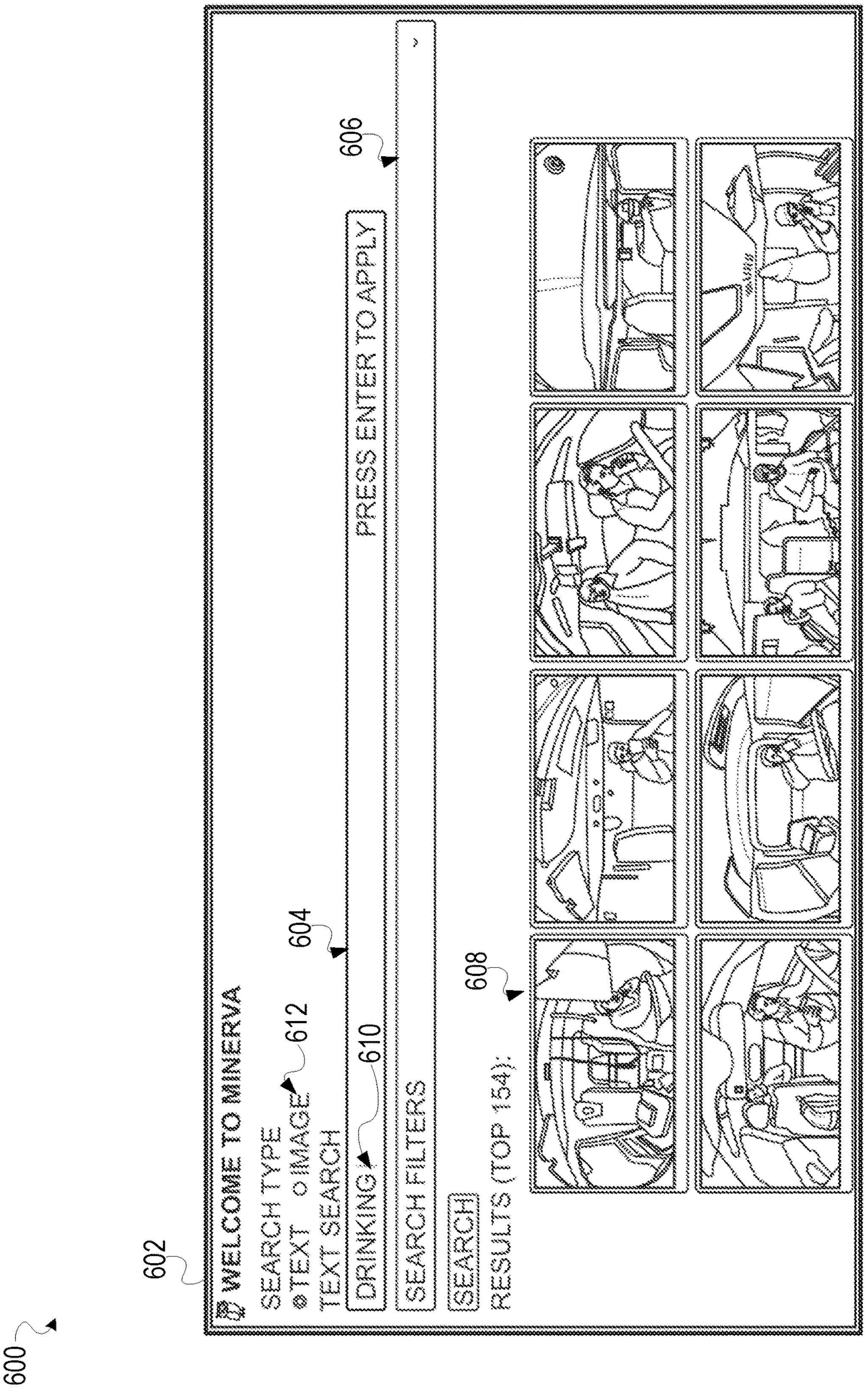
FIG. 6 is an interface diagram depicting a graphical user interface (GUI) to receive a user prompt and display one or more images, according to certain example embodiments.

FIG. 6 is an interface diagram 600 depicting a GUI 602 to receive a user prompt 610 and display one or more identified images 608, according to certain example embodiments and as described in the method 300 of FIG. 3, the method 400 of FIG. 4, and the method 500 of FIG. 5.

As seen in the interface diagram 600, the GUI 602 contains a search field 604 where users can enter text describing their target object of interest, corresponding to operation 302 in method 300.

The GUI 602 also includes menu element 606 which allows selecting contextual filters on the search. Examples include restricting results to certain time ranges, locations, vehicles, etc. This contextual information can be matched against image metadata as in operation 312 of method 300.

In some embodiments, the GUI 600 may include prompt options 612 to allow toggling between text prompt entry in field 604 vs image prompt upload. Uploading image data enables multi-modal queries as detailed in method 400.

Identified images 608 matched to the user prompt 610 are displayed in a display region of the GUI 602. Images can be presented in ranked order per operation 506 of method 500. The displayed images assist users in refining their search prompt.

In some embodiments, bounding boxes can be overlaid on relevant regions of images 608 as described in operation 314 of method 300. Similarity scores and other metadata can also be displayed.

Figure 7:
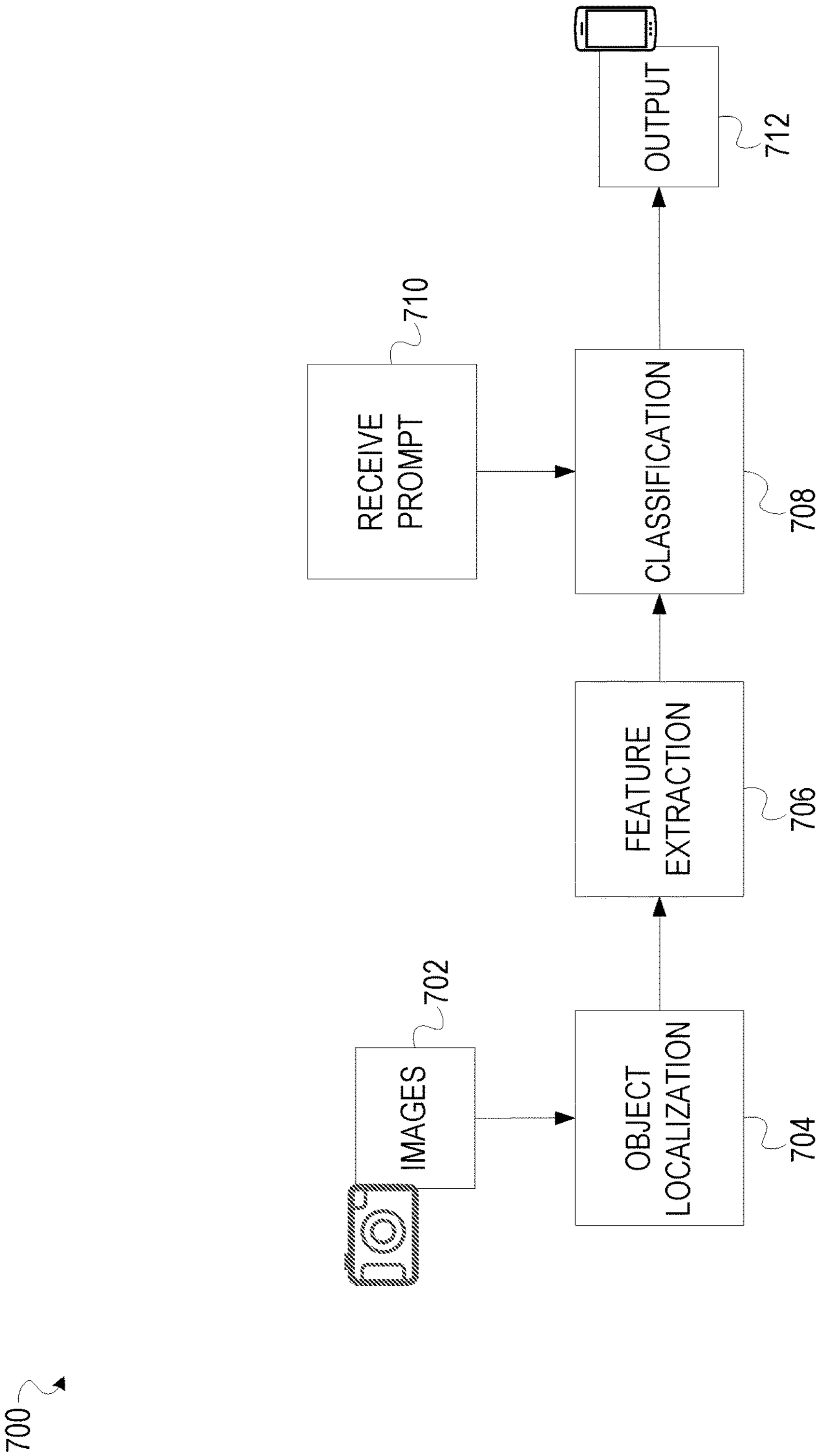
FIG. 7 is a flow diagram depicting a method of identifying one or more images based on a user prompt, according to certain example embodiments.

FIG. 7 is a flow diagram 700 depicting a method of identifying one or more images based on a user prompt, according to certain example embodiments, and as described in the method 300 of FIG. 3, the method 400 of FIG. 4, and the method 500 of FIG. 5.

The process begins with one or more candidate images 702 which can originate from various sources, or from within a repository such as a database 120. The candidate images are fed to the object detection system 124 for object localization at step 704.

Object localization 704 detects objects within the candidate images. As detailed in FIGS. 3-4, known techniques like selective search, edge detection, segmentation models, region proposal networks, etc. can identify bounding boxes around objects depicted within the candidate images 702.

At operation 706, feature extraction is performed on the bounding box crops, which encodes each region into an embedding vector representing its visual features. Encoder techniques like CLIP described in FIG. 4 can be utilized. The output embedding vectors capture the semantic visual features of each region.

In parallel, the user provides a prompt 710 describing their desired target object or concept. As discussed in FIG. 4, the prompt can include text, images, or both. The prompt 710 is encoded it into an embedding vector matching the format of the region embeddings.

At operation 708, the object detection system 124 performs a classification to compares the prompt embedding with each region embedding using mathematical similarity techniques like cosine distance. Regions with embedding vectors close to the prompt are judged as matches.

At operation 712, an output is provided, wherein the output includes identified images containing matching regions based on the comparisons. As described in FIG. 5, images can be ranked and presented via a graphical user interface.

Figure 8:
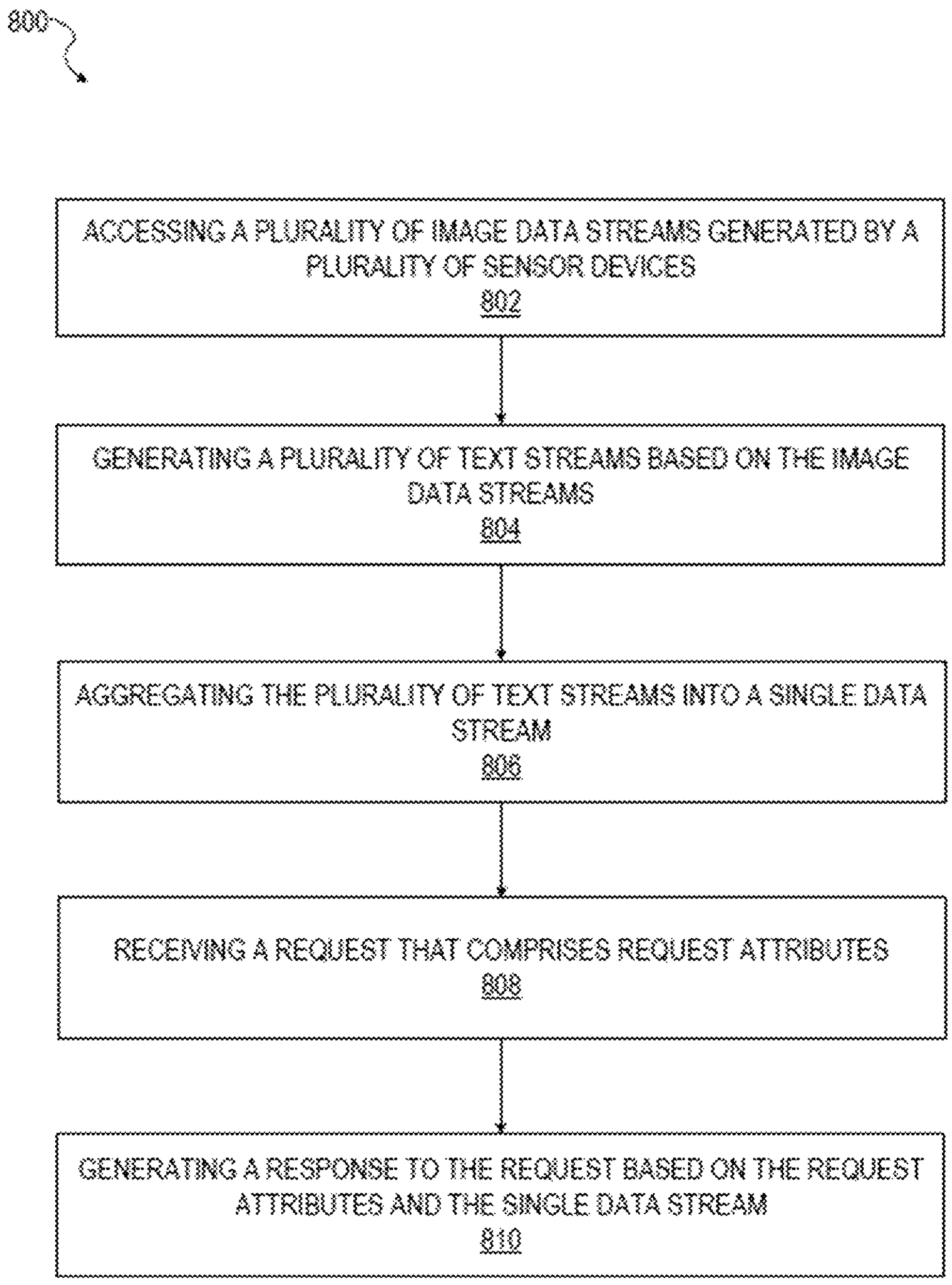
FIG. 8 is a flowchart depicting a method 800 of providing text-based information retrieval, according to certain example embodiments.

FIG. 8 is a flowchart depicting a method 800 of providing text-based information retrieval, according to certain example embodiments. Operations of the method 800 may be performed by the modules described above with respect to FIG. 2. As shown in FIG. 8, the method 800 includes one or more operations 802, 804, 806, 808, and 810.

At operation 802, multiple sensor devices (i.e., camera devices) are situated at different physical site locations. The camera devices continuously generate live video or image feeds. Metadata including the site name, specific camera ID, and timestamp are associated with each frame of the video feeds.

At operation 804, the video or image frames are processed by the object detection system 124 to extract text descriptions of the contents of each frame. Computer vision techniques like OCR or image classification models may be used to detect objects, people, vehicles, text, and other details in the frames. The text generated for each frame includes the site metadata so events can be traced back to the source.

At operation 806, the raw text streams from each camera aggregated into a single chronological text stream of events. The object detection system 124 may summarize events across cameras to reduce redundancy. It also uses configured interest priors to filter out non-relevant events and keep only important detected events.

At operation 808, users interact with one or more interfaces presented by the object detection system 124 to submit various requests. This includes natural language queries to search the aggregated event stream, setting alerts that trigger when specific criteria are met, and generating reports that compile events meeting query parameters. Queries may also incorporate additional data like schedules, sensor readings, and other data sources.

At operation 810, the object detection system 124 processes the requests and handles each request appropriately based on attributes of the requests. For natural language queries, it searches the aggregated text stream and returns excerpt results or summaries. For alerts, it monitors the text stream and sends notifications when a configured rule is triggered. For reports, it compiles relevant events, formats them into a template structure, and outputs the report.

Figure 9:
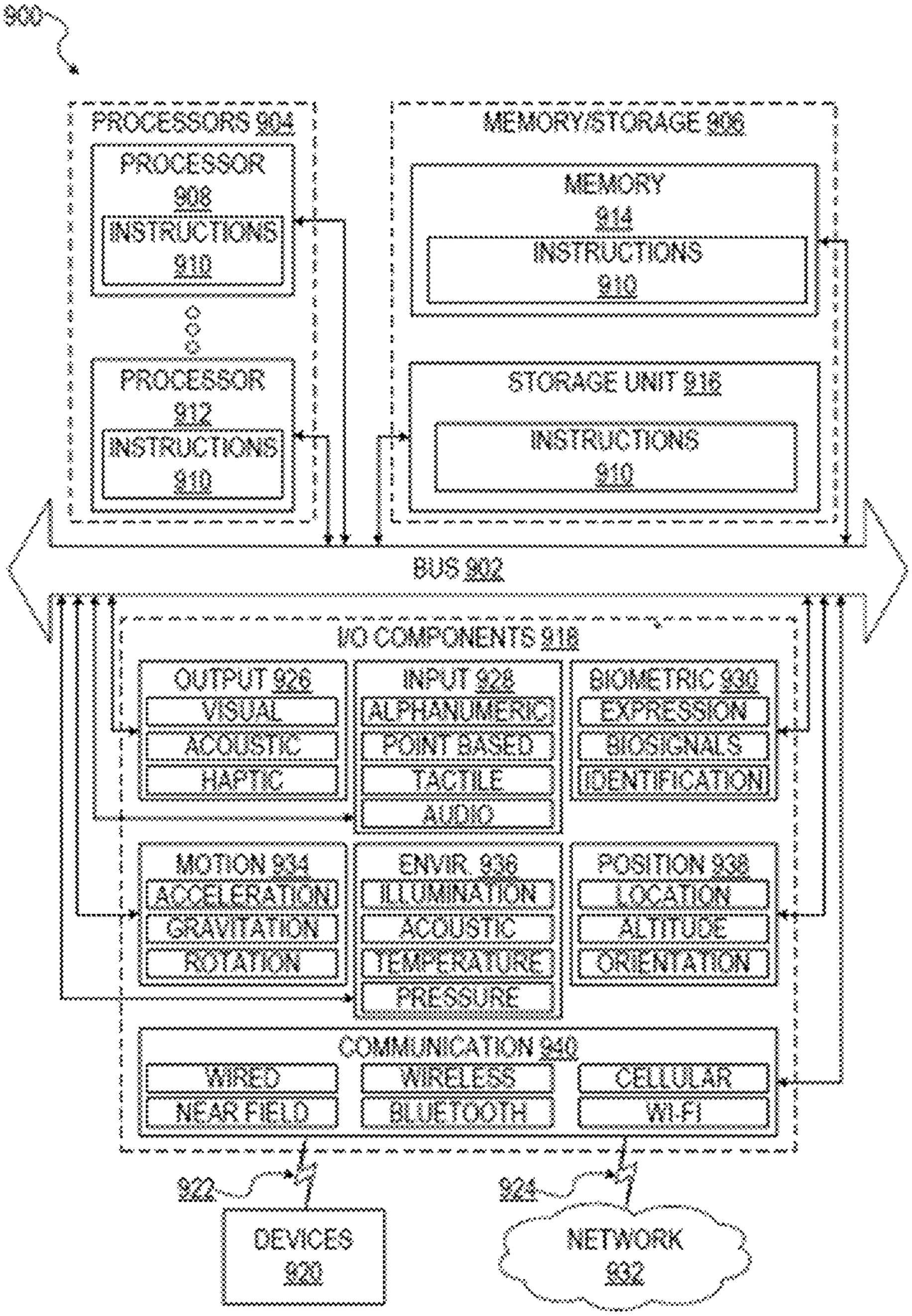
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:

receiving a user prompt that describes a target object, the user prompt comprising a target context;

generating a feature embedding vector based on the user prompt that describes the target object;

processing one or more images to generate a plurality of bounding box regions that correspond with one or more objects depicted within the one or more images, the one or more images comprising metadata that indicates contextual information associated with the one or more images;

generating a plurality of feature embedding vectors based on the plurality of bounding box regions that correspond with the one or more objects depicted within the one or more images;

performing a comparison of the feature embedding vector with each of the plurality of feature embedding vectors;

identifying an input image from among the one or more images based on the comparison, the target context of the user prompt, and the metadata associated with the image; and causing display of a presentation of the input image.

2. The method of claim 1, wherein the user prompt comprises one or more of:

a text string that describes the target object; and image data that depicts the target object.

3. The method of claim 2, wherein the generating the feature embedding vector based on the user prompt includes:

generating a first embedding vector based on the text string;

generating a second embedding vector based on the image data;

concatenating the first embedding vector and the second embedding vector to generate the feature embedding vector of the user prompt.

4. The method of claim 1, wherein the presentation of the image includes a display of a bounding box upon a region of the image that corresponds with the user prompt.

5. The method of claim 1, wherein the identifying the image includes:

identifying a set of images from among the one or more images, the set of images including the image; and wherein the presentation of the image includes the set of images.

6. The method of claim 5, further comprising:

determining a ranking of the set of images; and wherein the presentation of the set of images is based on the ranking.

7. The method of claim 1, further comprising:

generating a similarity score based on the user prompt and the image; and wherein the presentation of the image includes the similarity score.

8. The method of claim 1, wherein the processing the one or more input images includes:

accessing video data; and generating a plurality of video frames that comprise the one or more input images.

9. The method of claim 1, wherein the receiving the user prompt that describes the target object includes:

accessing user profile data, the user profile data including the user prompt; and accessing the user prompt from the user profile data.

10. A system comprising:

a memory; and at least one hardware processor to perform operations comprising:

receiving a user prompt that describes a target object, the user prompt comprising a target context;

generating a feature embedding vector based on the user prompt that describes the target object;

processing one or more images to generate a plurality of bounding box regions that correspond with one or more objects depicted within the one or more images, the one or more images comprising metadata that indicates contextual information associated with the one or more images;

generating a plurality of feature embedding vectors based on the plurality of bounding box regions that correspond with the one or more objects depicted within the one or more images;

performing a comparison of the feature embedding vector with each of the plurality of feature embedding vectors;

identifying an input image from among the one or more images based on the comparison, the target context of the user prompt, and the metadata associated with the image; and causing display of a presentation of the input image.

11. The system of claim 10, wherein the user prompt comprises one or more of:

a text string that describes the target object; and image data that depicts the target object.

12. The system of claim 11, wherein the generating the feature embedding vector based on the user prompt includes:

generating a first embedding vector based on the text string;

generating a second embedding vector based on the image data;

concatenating the first embedding vector and the second embedding vector to generate the feature embedding vector of the user prompt.

13. The system of claim 10, wherein the presentation of the image includes a display of a bounding box upon a region of the image that corresponds with the user prompt.

14. The system of claim 10, wherein the identifying the image includes:

identifying a set of images from among the one or more images, the set of images including the image; and wherein the presentation of the image includes the set of images.

15. The system of claim 14, further comprising:

determining a ranking of the set of images; and wherein the presentation of the set of images is based on the ranking.

16. The system of claim 14, further comprising:

generating a similarity score based on the user prompt and the image; and wherein the presentation of the image includes the similarity score.

17. The system of claim 10, wherein the processing the one or more input images includes:

accessing video data; and generating a plurality of video frames that comprise the one or more input images.

18. A non-transitory machine-readable storage medium comprising instructions that, when executed by one or more processors of a machine, cause the machine to perform operations comprising:

receiving a user prompt that describes a target object, the user prompt comprising a target context;

generating a feature embedding vector based on the user prompt that describes the target object;

processing one or more images to generate a plurality of bounding box regions that correspond with one or more objects depicted within the one or more images, the one or more images comprising metadata that indicates contextual information associated with the one or more images;

generating a plurality of feature embedding vectors based on the plurality of bounding box regions that correspond with the one or more objects depicted within the one or more images;

performing a comparison of the feature embedding vector with each of the plurality of feature embedding vectors;

identifying an input image from among the one or more images based on the comparison, the target context of the user prompt, and the metadata associated with the image; and causing display of a presentation of the input image.

* * * * *